(12) United States Patent
Blomgren

(10) Patent No.: US 6,209,076 B1
(45) Date of Patent: Mar. 27, 2001

(54) METHOD AND APPARATUS FOR TWO-STAGE ADDRESS GENERATION

(75) Inventor: James S. Blomgren, Austin, TX (US)

(73) Assignee: Intrinsity, Inc., Austin, TX (US)

( * ) Notice: Subject to any disclaimer, the term of this patent is extended or adjusted under 35 U.S.C. 154(b) by 0 days.

(21) Appl. No.: 09/122,504

(22) Filed: Jul. 24, 1998

Related U.S. Application Data
(60) Provisional application No. 60/065,690, filed on Nov. 18, 1997.

(51) Int. Cl.[7] ................................................. G06F 12/00
(52) U.S. Cl. .......................... 711/214; 711/219; 711/220
(58) Field of Search .................................. 711/215, 214, 711/212, 211, 219, 169, 220

(56) References Cited

U.S. PATENT DOCUMENTS

| | | | |
|---|---|---|---|
| 5,233,553 | 8/1993 | Shak et al. | 708/491 |
| 5,511,017 | 4/1996 | Cohen et al. | 708/491 |
| 5,790,443 | 8/1998 | Shen et al. | 708/491 |

*Primary Examiner*—Tuan V. Thai
*Assistant Examiner*—Matthew D. Anderson
(74) *Attorney, Agent, or Firm*—Booth & Wright, LLP; Matthew J. Booth

(57) ABSTRACT

The present invention is an apparatus and method for two-stage address generation that uses pipelining to avoid one level of latency in certain address-generation situations. The first level of the present invention contains redundant three-lever hardware that performs pre-add logic on 32-bit or 16-bit operands. The pre-add logic circuit for 32-bit operands comprises three carry-save adders. For 16-bit operands, the pre-add logic circuit comprises a four-port three-level 16-bit adder. The second stage comprises a three-logic level adder that adds two operands.

The method of the present invention avoids one level of latency for simple address generation, although both stages are always utilized. For complex address generation, both latency cycles are required. Regarding dependent generation, the present invention provides a single-cycle latency bypass datapath that also avoids one level of latency.

31 Claims, 7 Drawing Sheets

METHOD AND APPARATUS FOR TWO-STAGE ADDRESS GENERATION

This application claims the benefits of the earlier filed U.S. Provisional Application Ser. No. 60/065,690, filed Nov. 18, 1997, which is incorporated by reference for all purposes into this application.

BACKGROUND OF THE INVENTION

1. Field of the Invention

The present invention relates to digital computing, and more particularly to address generation in a computer's processor.

2. Description of the Related Art

A typical computer instruction must indicate not only the operation to be performed but also the location of the operand(s). An important function in microprocessors is the generation of operand addresses for load and store instructions. In RISC microprocessors, these addresses are typically determined by adding a pair of general purpose registers together, or by adding a constant displacement value contained in the load or store instruction itself to a general purpose register. Less common is the case where an address is filly indicated either by a register or a displacement and no addition is thus required. This less common case is treated as an addition where one of the addends is zero. In all of these cases, a single addition is performed, and the length of time to determine the address is constant.

This constant latency address generation is a feature of RISC processors but is not a feature of CISC processors. CISC processors support much more complex address generation, where more than two values are summed to obtain the operand address. One popular commercial architecture is the x86 architecture embodied in CPU's manufactured by the Intel Corporation of Santa Clara, California. In the x86 family of microprocessors, it is possible to add the contents of four registers in addition to a constant displacement from the load and/or store instruction. This allows the possibility of adding five 32-bit operands in order to obtain the operand address. Also complicating the process of address generation is the fact that one of the five operands, the index, can be multiplied by 1, 2, 4, or 8. These factors result in a more complex form of address generation than the constant latency approach of RISC processors. This additional complexity results in a slower operand addressing unit For example, if it is possible to add two 32-bit numbers in three levels of logic, it may require five levels of logic to add five 32-bit numbers.

In addition to CISC architecture and instruction sets, another feature available on some processors is pipelining. By placing latches at feed-forward cutsets, pipelining can increase the clock rate of the system. A latch refers to a storage unit or buffer or register. A cutset is a minimal electrical subnetwork, the removal of which cuts the original electronic network into two connected pieces. One effect of placing latches within a system to achieve the benefits of pipelining is that the system latency may be increased in certain situations.

The five components that may be added to generate an address within a CISC processor are the four register components plus the displacement value from the load or store instruction. The first register component relates to the feature of typical microprocessor systems that uses paging and segmentation of memory. This first register component is the base address value of the segment where the operand lies, called the segment_base. The other register components are the base, index, and bit_offset values. The bit_offset component is typically scaled by a constant value of 1/8th. Accordingly, the bit_offset component is typically shifted to the right by three bit positions to obtain a byte address. This results in the bit_offset component containing only 29 useable bits. The bits shifted out on the right are disposed of for the purposes of address generation.

CISC processors, including those of the x86 family, do not always add all five components. In fact, the most frequent operation is the addition of just two or three operands. Past designs of the x86 architecture have exploited fixed-latency operand address generators, which pay a time penalty in cases where the full generation complexity is not required. Such generators do not derive a benefit from the increased sample rate possible within pipelined systems. What is desired is an address generation unit that can take advantage of the nature of pipelined processing to allow address generation to take one cycle of latency in the simple cases, and two cycles of latency in the more complex cases. Due to the nature of pipelining microprocessors, the effect of the latency is to allow bypassing of results more quickly to following dependent operations, while the actual number of stages of the address generator is two for both simple and complex address combinations.

SUMMARY OF THE INVENTION

The present invention is an apparatus and method for two-stage address generation that comprises a first stage, a second stage, and at least one multi-cycle bypass datapath. Each stage comprises one level of logic that peforms bypass logic. The first stage comprises a pre-add logic circuit, an index scaler circuit, and a first-stage bypass circuit Some bypass processing is performed by the first-stage bypass circuit. Bypass processing for the index is performed by the index scaler circuit. For those components that are immediate values, a bypass buffer, instead of a mux, is provided to keep propagation delays constant for the component values.

In addition to bypass logic, the first stage further comprises redundant hardware, comprising of three levels of logic, that performs addition of up to five components in order to produce a redundant sum. This three-logic-level pre-add logic circuit comprises three carry-save adders to perform pre-add logic for 32-bit operands and also contains a four-port adder to perform pre-add logic for 16-bit operands.

The second stage of the present invention also comprises a bypass logic level and contains a three-level adder to perform true add to generate the operand address. The adder of the second stage also possesses the capability to add a small adjust value to its two operands in order to generate dependent addresses.

The method of the present invention avoids one level of latency for simple address generation, although both stages are always utilized. For complex address generation, both latency cycles are required. Regarding dependent generation, the present invention provides a single-cycle latency bypass datapath that also avoids one level of latency.

DETAILED DESCRIPTION OF THE INVENTION

The present invention relates to an improvement in address generation. This disclosure describes numerous specific details that include specific formats, structures, circuits, and logic functions in order to provide a thorough understanding of the present invention. One skilled in the art will appreciate that one may practice the present invention without these specific details. Additionally, this disclosure does not describe in detail some well-known structures such as multiplexers, carry-save adders, pipeline latches and traditional adders, in order not to obscure the present invention.

Figure 1:
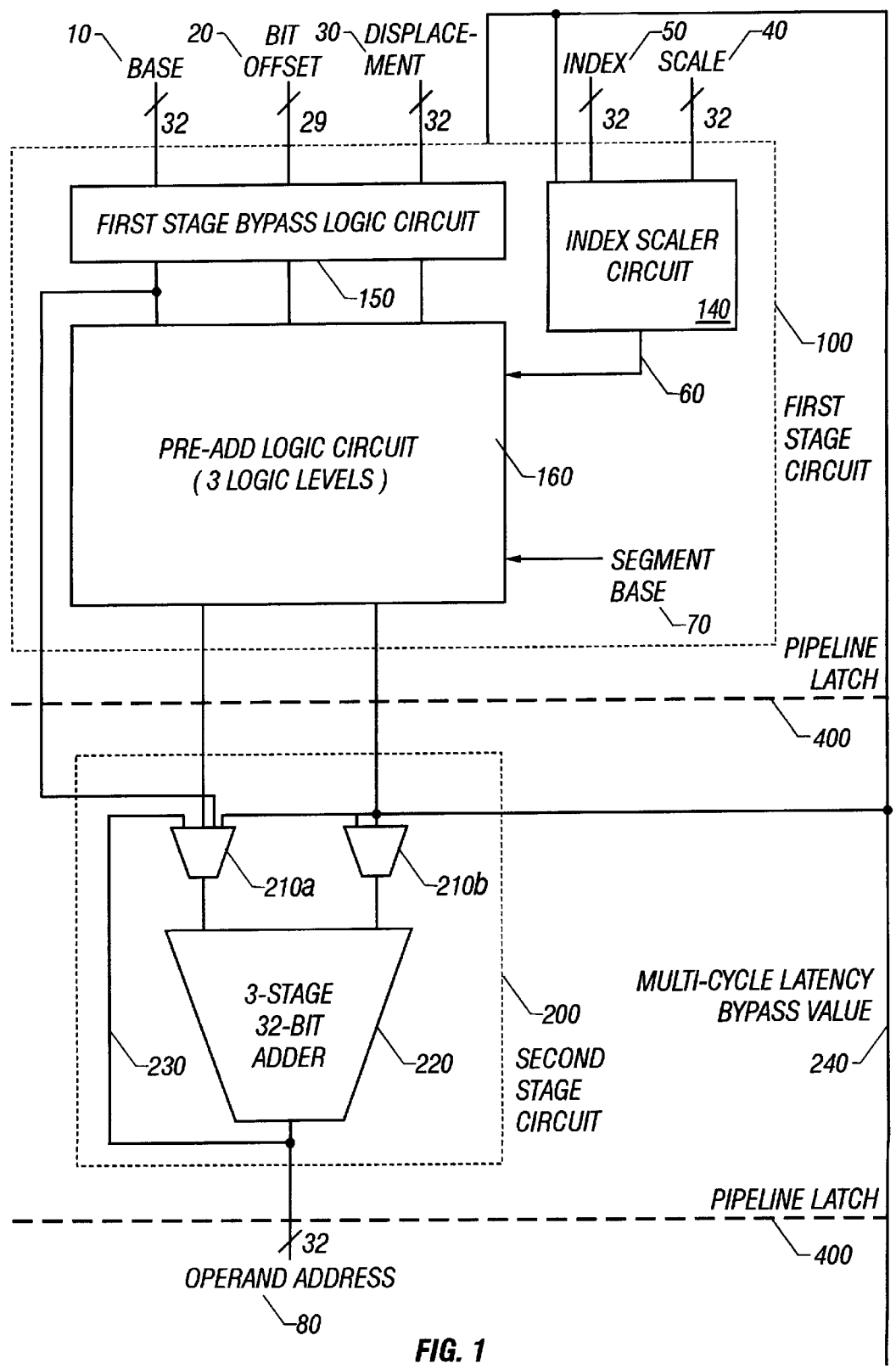
FIG. 1 is a block diagram of an apparatus for two-stage address generation.

FIG. 1 shows a block diagram of an apparatus for two-stage mixed-modulus address generation according to the present invention. The apparatus comprises two stages 100, 200 and a multi-cycle bypass value datapath 240. The first stage 100 and the second stage 200 are piplelined using latches 400. Each stage 100, 200 contains four levels of logic—one level of logic for operand bypass selection and three levels of logic to perform the desired function. FIG. 1 illustrates that the first stage 100 comprises a first-stage bypass logic circuit 150, a pre-add logic circuit 160, and an index scaler circuit 140. The first-stage bypass logic circuit 150 provides one level of logic to perform any necessary operand bypass as described below. The index scaler circuit 140 also contains a level of logic to perform bypass, if necessary, on the index 50. The pre-add logic circuit provides three levels of logic to perform addition of five component values 10, 20, 30, 40, 50 (or their bypass values). The result of the pre-add logic circuit is a sum in redundant form—that is, two values that must be added together.

FIG. 1 also illustrates the second stage 200 of the present invention. As with the first stage 100, the second stage 200 comprises one level of bypass logic and three logic levels that perform the desired addition. The second stage 200 contains a bypass stage comprising bypass muxes 210 and a three-logic-level adder 220 that creates the desired operand address 80. The present invention thus performs the most complex form of address generation possible in the x86 architecture within two stages and with no multi-pass requirements. By eliminating multiple passes within a stage, the pipeline effect can be fully realized.

Complex Address Generation

Figure 6:
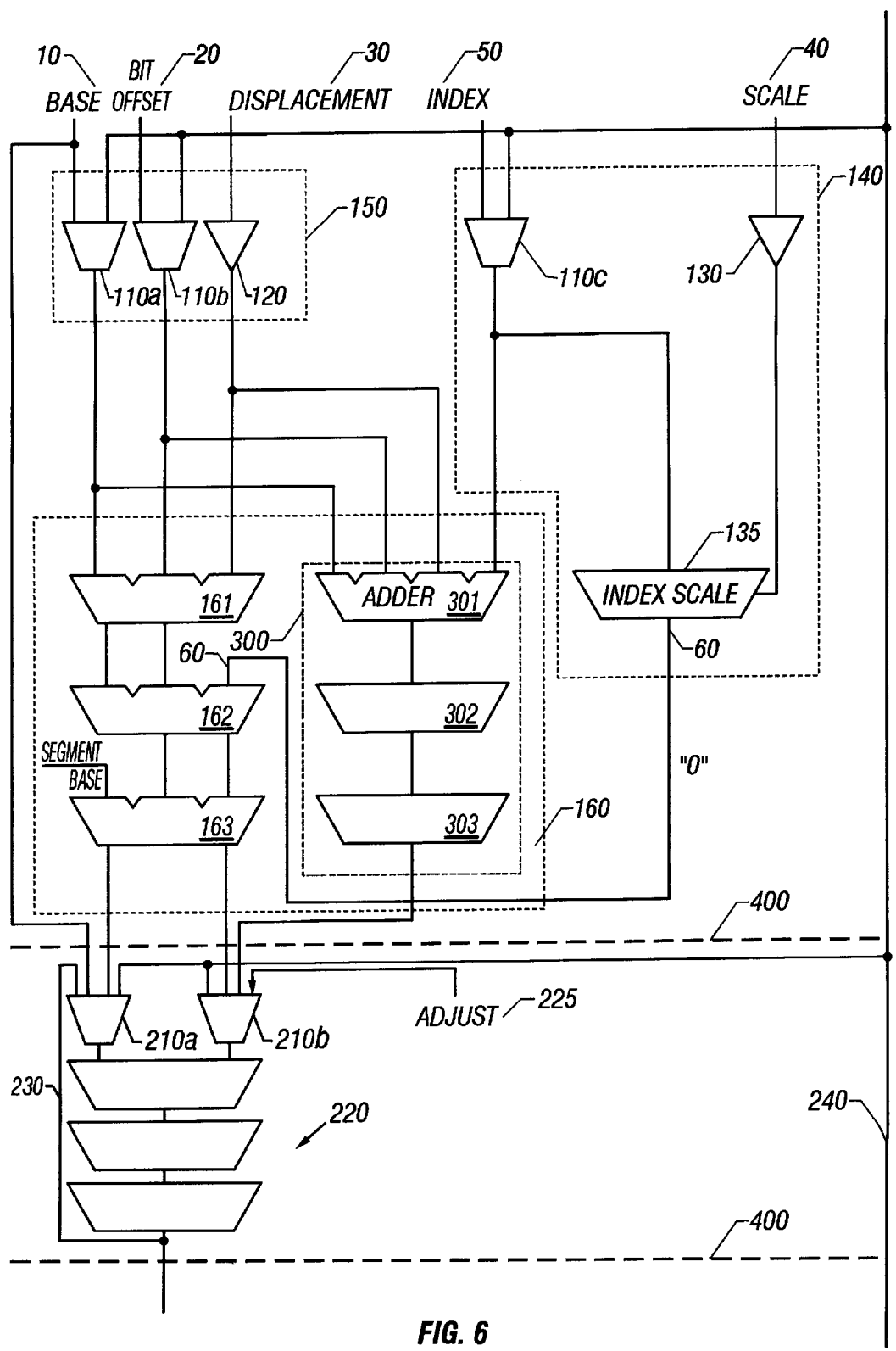
FIG. 6 illustrates complex address generation under the present invention.

FIG. 6 illustrates complex address generation under the present invention. The first-stage bypass logic circuit 150 provides bypass muxes 110a, 110b, and a displacement buffer 120 to perform any necessary operand bypass as described below. Similarly, the index scaler circuit 140 provides bypass mux 110c and scale buffer 130 to perform any necessary bypass of the index. The first stage 100 also provides three levels of logic, in the pre-add logic circuit 160, to perform the pre-add function of the present invention. The invention contains redundant hardware that provides three levels of logic 161, 162, 163 to perform 32-bit pre-add functionality, and also provides a four-port three logic level adder 300 to perform 16-bit modulus pre-add functionality.

Figure 2:
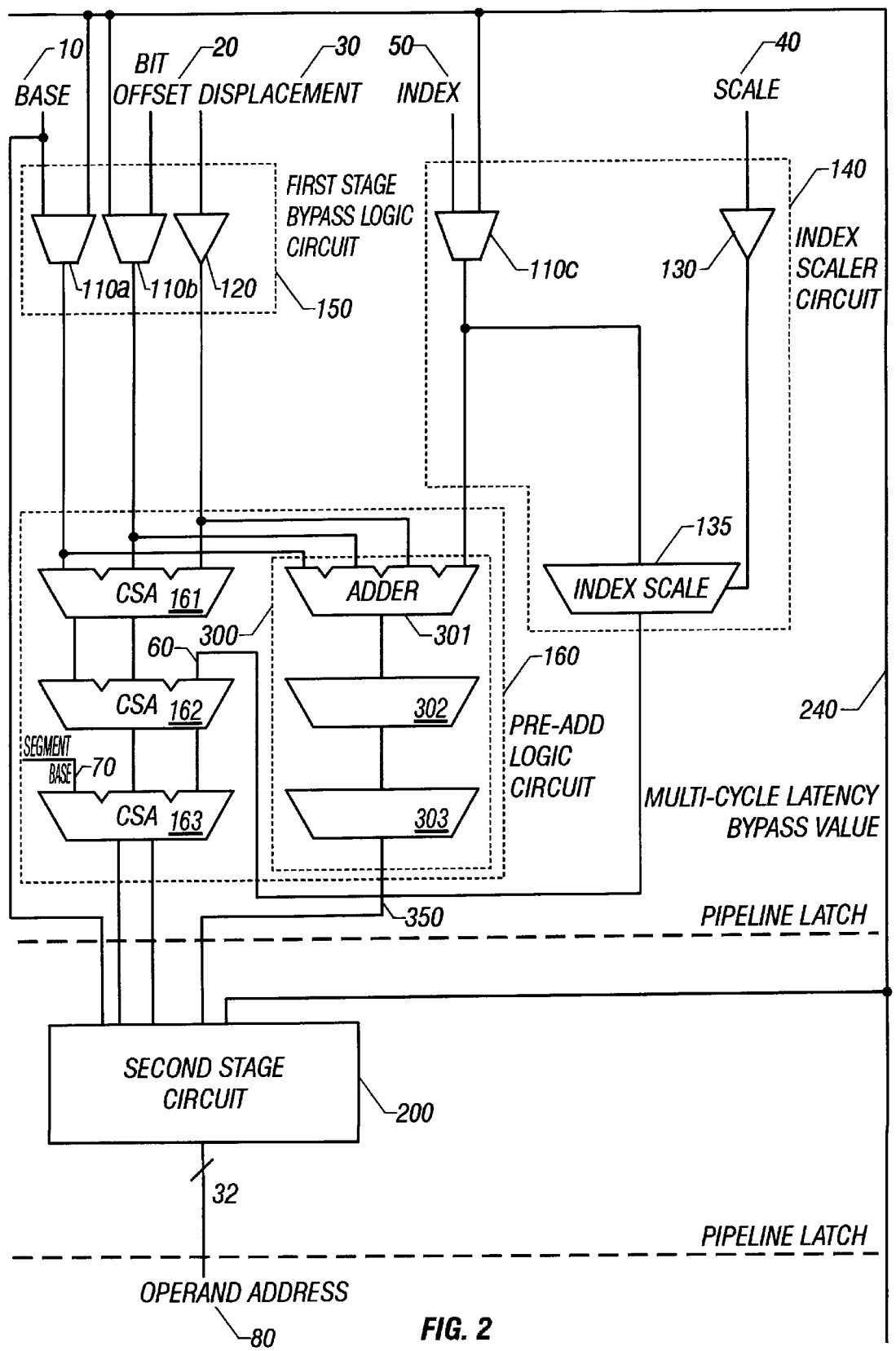
FIG. 2 illustrates the first stage of the present invention.

FIG. 2 illustrates that the pre-add logic circuit for 32-bit operands 160 contains three carry-save adders 161, 162, 163 in order to add the five necessary components 10, 20, 30, 40, 50. The first carry-save adder 161 consolidates the following three components of a complex address into two components of a redundant sum: the base 10, bit_offset 20, and displacement 30. At the same time that these three component values 10, 20, 30 are being added, the index scale multiplier 135 scales the index 50. In order to scale the index 50, the index scale multiplier 135 multiplies the index 50 by the scale value 40 of 1, 2, 4, or 8.

The second carry-save adder 162 then adds the redundant sum result of the first carry-save adder 161 to the scaled index 60 to produce a redundant sum of all four components 10, 20, 30, and 60. Thus, in the first and second logic levels 161, 162 and in the index scale multiplier 135, whose operation occurs during the operation of the first carry-save adder 161, the present invention scales the index 50 and adds the scaled index 60 to the displacement 30, base 10, and bit_offset 20 operands to produce a redundant sum of all four components. If any of these four components 10, 20, 30, 60, are not necessary for the address generation, they are simply selected to be zero. The zero selection function may be implemented in the present invention either in the carry-save adders 161, 162, 163 or the bypass muxes 110, 210.

Finally, in the third carry-save adder 163 of the pre-add logic circuit 160, the redundant sum produced by the second carry-save adder 162 is added to the segment_base 70. The result produced by the third carry-save adder 163 is a redundant sum.

FIG. 1 also depicts the second stage 200 of the present invention. As with the first stage 100, the second stage 200 also begins with bypass logic 210a, 210b. The second stage 200 then contains a three logic-level adder 220 for producing the desired operand address 80. The operands fed into the adder 220 will be one of the following: the redundant sum produced by the third carry-save adder 163 of the first stage 100, the sum produced by the four-port three-stage 16-bit adder 300 of the first stage 100, the base 10, or addresses or address components received from one of the bypass paths 230, 240. The result produced by the second stage 200 is the operand address 80.

While two stages are required for complex address generation, the present invention performs the most complex form of address generation possible in the x86 architecture with no multi-pass requirements. This is a valuable simplification, and yet still allows the pipeline to operate at a speed consistent with four gate delays per stage.

Bypass Function

FIG. 1 discloses that each stage 100, 200 contains a level of logic 110, 210 for operand bypass selection. While the present invention requires two pipeline stages to generate addresses, regardless of how simple or complex they are, the present invention may bypass some components more quickly. This bypass occurs in simple address generation and for cases where dependent addresses are involved. Each of these situations is discussed in more detail below.

FIG. 6 illustrates one multi-cycle bypass datapath 240 and one single-cycle bypass datapath 230 with one set of bypass muxes 110, 210 for each stage 100, 200. However, one skilled in the art will recognize that operands can be bypassed from a wide variety of sources and that bypass muxes must handle each of these many sources. The bypassing of components in the first stage is handled for the base 10 and bit offset 20 by the first-stage bypass logic circuit 150. Although the displacement 30 does not require bypassing, as is discussed below, the first-stage bypass logic circuit 150 stores the displacement 30 in a buffer 120 in order to keep propagation delays relatively constant within the first-stage bypass logic circuit 150. The bypassing of the index 50 is handled in the first stage 100 by the index scaler circuit 140, with the scale 40 being similarly stored in a buffer 130.

Referring again to FIG. 1, it is apparent that some address generation inputs do not require bypassing. That is, some inputs are immediate values and will never require a latency stall. For instance, the displacement 30 is a hard-coded immediate value within the instruction and is not modified by any other instruction. Similarly, the scale amount 40 is an immediate value. These values do not require bypass muxes. Instead, FIG. 6 illustrates that simple buffers 120, 130 are provided for these inputs in order to keep the propagation delays of all data paths leading into the pre-add logic circuit 160 constant.

The segment_base 70 typically does not change and therefore does not typically require bypassing. While there are cases where a segment_base 70 will change, it is possible to ensure that no bypassing for the segment_base 70 will ever be required. This is accomplished by preventing the segment_base value 70 from being used for address generation for a number of cycles equal to the time while the new value is in the pipeline and has not yet been written to the register file.

Simple Address Generation

Simple address generation refers to the process of generating an address from only two operands. Under the present invention, simple address generation requires no latency stall during the first stage 100. The elimination of one stage of latency during address generation dramatically improves the performance of certain processing.

One-Stage Latency for Two-operand Operations

Simple address generation involves the addition of just two components. If there are more than two components required to generate an address, then there simply is no way to avoid the two full stages of latency 100, 200 depicted in FIG. 1. The fact that address generation using only two operands allows one-stage latency instead of requiring two-stage latency may be better understood by examining the output of the third carry-save adder 163 of the first stage 100 illustrated in FIG. 2. The output of the third carry-save adder 163 will be a redundant sum if more than one component is involved. If only one component is involved in the first stage 100, then the redundant sum will include one all-zero value. This feature permits some other value to be selected in one of the bypass muxes 210 of the second stage 200 to be input to the adder 220 instead of the all-zero value of the redundant sum produced by the third carry-save adder 163 of the first stage 100.

In the x86 instruction set, the segment_base 70 is added in all cases. Thus, one of the two operands used for simple address generation is always the segment_base 70. The remaining operand must logically therefore constitute either a base 10, index 50, bit_offset 20, or displacement 30. The bit_offset 20 is not a practical option because x86 address generation does not permit address generation by addition of a bit offset to a segment_base. Similarly, x86 address generation discourages the generation of addresses by addition of an index 50 to a segment_base 70. Therefore, simple address generation will involve the addition of either the displacement 30 or the base 10 to the segment_base 70.

Segment_base+Displacement

Figure 3:
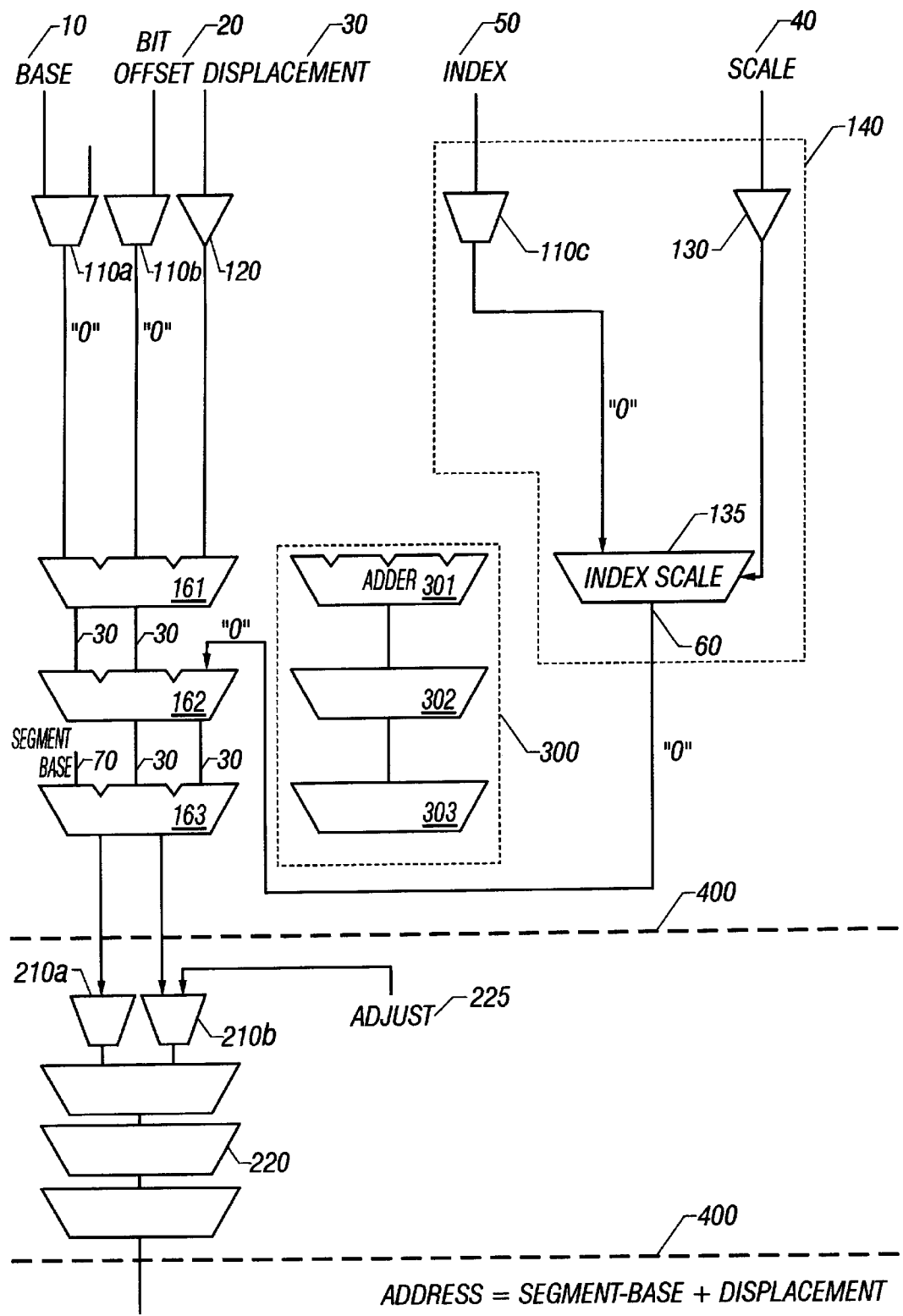
FIG. 3 is a data flow diagram for simple address generation adding segment base + displacement.

FIG. 3 illustrates data flow in the present invention for simple address. generation from the displacement 30 and the segment_base 70. If the address is to be generated from the displacement 30 and the segment_base 70, the remaining operands will be selected to zero. The bypass inputs will never be selected because there is no concern for stale values in simple address generation when adding a segment base and a displacement. The displacement 30 is an immediate value and therefore does not require bypass support. Similarly, the segment_base 70 may be implemented, as described above, so that it does not require bypass support.

FIG. 3 illustrates that the displacement 30 will be added to zero values in the first carry-save adder 161 of the first stage 100. At the same time, the index scale multiplier 135 will also produce a zero value. The output of the first carry-save adder 161, which equals the value of the displacement 30, will be added by the second carry-save adder 162 to the zero value produced by the index scale multiplier 135. The output from the second carry-save adder 162 will be the value of the displacement 30. The output from the second carry-save adder 162 is added to the segment_base 70 by the third carry-save adder 163, producing a redundant sum. The redundant sum output from the third carry-save adder 163 is then processed by adder 220 during the second stage 200. Therefore, simple address generation from the segment_base 70 and displacement 30 will require both stages 100, 200 but will not require any latency stalls during the first stage 100 because both operands are immediate values.

Segment_base+Base

Figure 4:
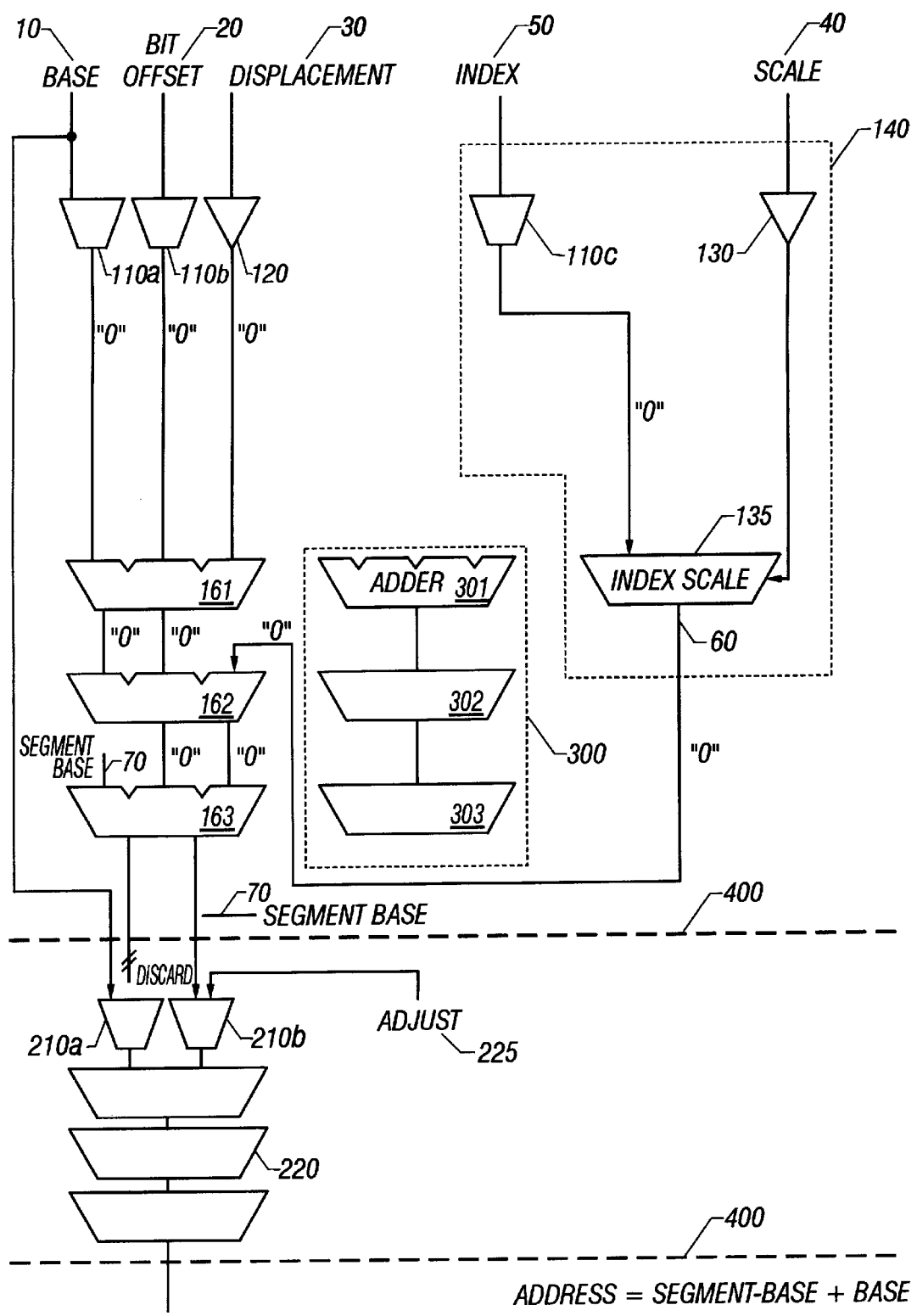
FIG. 4 is a data flow diagram for simple address generation adding segment base + base.

FIG. 4 illustrates data flow under the present invention for simple address generation from the segment_base 70 and the base 10. This simple address generation process must be handled differently from the process of adding segment_base 70 to displacement 30. The need for different processing arises from the fact that the value of base 10 could be stale at the beginning of the first stage 100. The present invention eliminates the need to stall in the first stage 100 to wait for the current value of base 10 to be delivered.

FIG. 4 illustrates simple address generation when the segment_base 70 is added to the base 10. In such a case, all inputs above the second carry-save adder 162 will be selected to zero and the output of the second carry-save adder 162 will therefore be zero. Only the segment_base 70 will be selected during the first stage 100. The output of the third carry-save adder 163 of the first stage 100 will be a redundant sum where one of the terms is zero, and that term can be discarded. The non-zero term is selected during the second stage 200 by the bypass mux 210b. The zero term is discarded, and instead, the other bypass mux 210a, selects the base 10 as the second input into the adder 220. Since the base 10 is selected at the beginning of the second stage 200, it is possible that the base 10 is being generated while the first stage 100 is busy. This eliminates the need to stall in the first stage 100 while waiting for the base 10 to be delivered, either because another functional unit is busy producing it, or because it is being fetched from memory and has not yet returned.

The simple form of address generation is especially important for chasing pointers in data structures. Data structures that can take advantage of single-stage address latency contain exact pointers that require no arithmetic. Eliminating one stage of latency dramatically improves the performance of processing such data structures.

Dependent Address Generation

Dependent address generation occurs when one address is dependent on a previously generated address. This is especially important in the x86 instruction set because of the abundance of stack instructions. Stack instructions include PUSH, POP, CALL and RETURN where operands are moved to and from memory and a "stack pointer" is implicitly updated to keep track of where the operands are located. PUSH and POP are used to save and restore operands across subroutine calls, and as such are encountered in multiples. When calling a subroutine it is common to PUSH many registers, then POP them upon returning. A sequence of more than one PUSH or POP is precisely a sequence of dependent addresses, since the address of one PUSH depends upon the address of the previous PUSH.

The requirements of address generation for dependent addresses are limited because the stack addresses are quite simple compared to the more complex forms of address generation possible in the x86 instruction set. Stack addresses comprise the addition of a segment_base (the stack segment), a stack pointer and a small offset This limits the requirements of address generation for dependent addresses.

Two-Latency Address Generation for Stack Instructions

The process of generating a stack instruction address differs depending on whether the instruction is the first stack instruction or whether it comes subsequent to a previous stack instruction, and whether or not it is a POP instruction. FIG. 1 illustrates stack instruction address generation when an initial stack instruction is encountered. When a stack instruction is first encountered, both stages 100, 200 of address generation occur. The first stage 100 adds a base 10 (the stack pointer), a displacement 30 (a relatively small positive or negative value), and the stack segment_base 70. Since three components are required, both stages 100, 200 must be used. The second stage 200 adds in adder 220 the redundant sum values produced by first-stage carry-save adder 160.

Single-Latency Address Generation for Stack Instructions

The latency of the first stage may be eliminated for the generation of addresses for stack instructions in two situations. The POP instruction only requires one latency cycle. Similarly, subsequent stack instructions after the initial in a series of stack instructions also only require one latency period.

In the case of POP instructions, the single-latency feature stems from the "post-decrement" feature. That is, the stack is post-decremented for POP instructions, meaning that there is no need to add a displacement value when generating the address for a POP instruction. Accordingly, the address generation for a POP instruction only requires two operands, the segment_base 30 of the stack and base 10 (stack pointer). As previously discussed, it is possible to eliminate the first stage latency in such a situation because only two addends are involved. This situation will be processed exactly like the "base+segment_base" situation illustrated in FIG. 2, where the base 10 value is selected by the bypass mux 210a at the beginning of the second stage 200.

The first-stage latency may also be eliminated on subsequent stack instructions. In contrast to the initial stack instruction discussed above, subsequent stack instructions have a simpler form of address generation. They produce addresses that are adjacent to the previously generated stack address. As a result, subsequent stack instructions do not require addition of the full three components that initial stack instructions require. The first stage 100 performs no function in this situation. Once an address is generated, it can be bypassed back to the next stack instruction and adjusted according to its operation. In this case, the 1-cycle latency bypass path 230 is used to pass the old generated operand address 80 back to a bypass mux 210a in the second stage 200. A small adjust value may be input as a constant (not shown) into one of the second stage bypass muxes 210 to handle the small adjustment necessary for stack instructions.

The result of the present invention is the ability to perform a sequence of stack instructions without stall cycles to wait for new stack pointer base values 10 to become available. This is critical for the performance of older x86 code, and allows stack updating and address generation to occur at a frequency corresponding to four gate delays, at one such operation per cycle.

16-Bit Address Generation

The present invention addresses a compatibility problem that arises when the present invention is utilized on a microprocessor with a standard address length of 16 bits, rather than 32 bits. In order to understand the compatibility problem, it is useful to understand that the "effective address" for an x86 instruction is the base address 10 added to the displacement value 30. This effective address is then added to the segment_base 70. In the 16-bit situation, modulo arithmetic must ordinarily be performed in order to truncate the effective address value and discard the carry bits. The truncation of the effective address value results in a wrap around of the effective address value so that it points within the 64K memory boundary. For example, if the base address value 10 is $2^{16}-1$ and the displacement value 30 is 11, the effective address is not ($2^{16}-1+11$). Instead, the effective address is truncated through modulo arithmetic so that it is represented within 16 bit positions. The carry bit is lost and the effective address wraps around so that it becomes an effective address of 10. Using a 32-bit adder, this intermediate truncation will not occur. Instead, a 32-bit adder will simply add 65,535 ((64K–1) or ($2^{16-1}$)) to 11, giving a value of 65,546 when the program is expecting a value of 10.

The present invention effectively handles the situation that, when operating in 16-bit address generation mode, the sum of all the address components other than the segment_ base 70 is greater than 65,536 ($2^{16-1}$). In this case, the present invention emulates truncation of the "real" portion of the address to 16 bits before the segment_base 70 is added. At least two patents address this intermediate truncation function for 16-bit wraparound function within a 32-bit adder: U.S. Pat. No. 5,233,553, titled "Apparatus for Performing Modulo Arithmetic with Three-port Adder," issued to Shak et al, and U.S. Pat. No. 5,511,017, titled "Reduced-Modulus Address Generation Using Sign-Extension and Correction," issued to Cohen et al.

The present invention differs significantly from the prior art in supporting 16-bit address generation. In contrast to the 32-bit address generation disclosed above, 16-bit address generation does not allow for scaling of an index register and the address components are smaller. The most complex form of 16-bit address generation with wraparound is:

address=segment_base+(base+index+bit_offset+ displacement) MOD 64K where base, index, bit_offset and displacement are 16-bit values.

Figure 5:
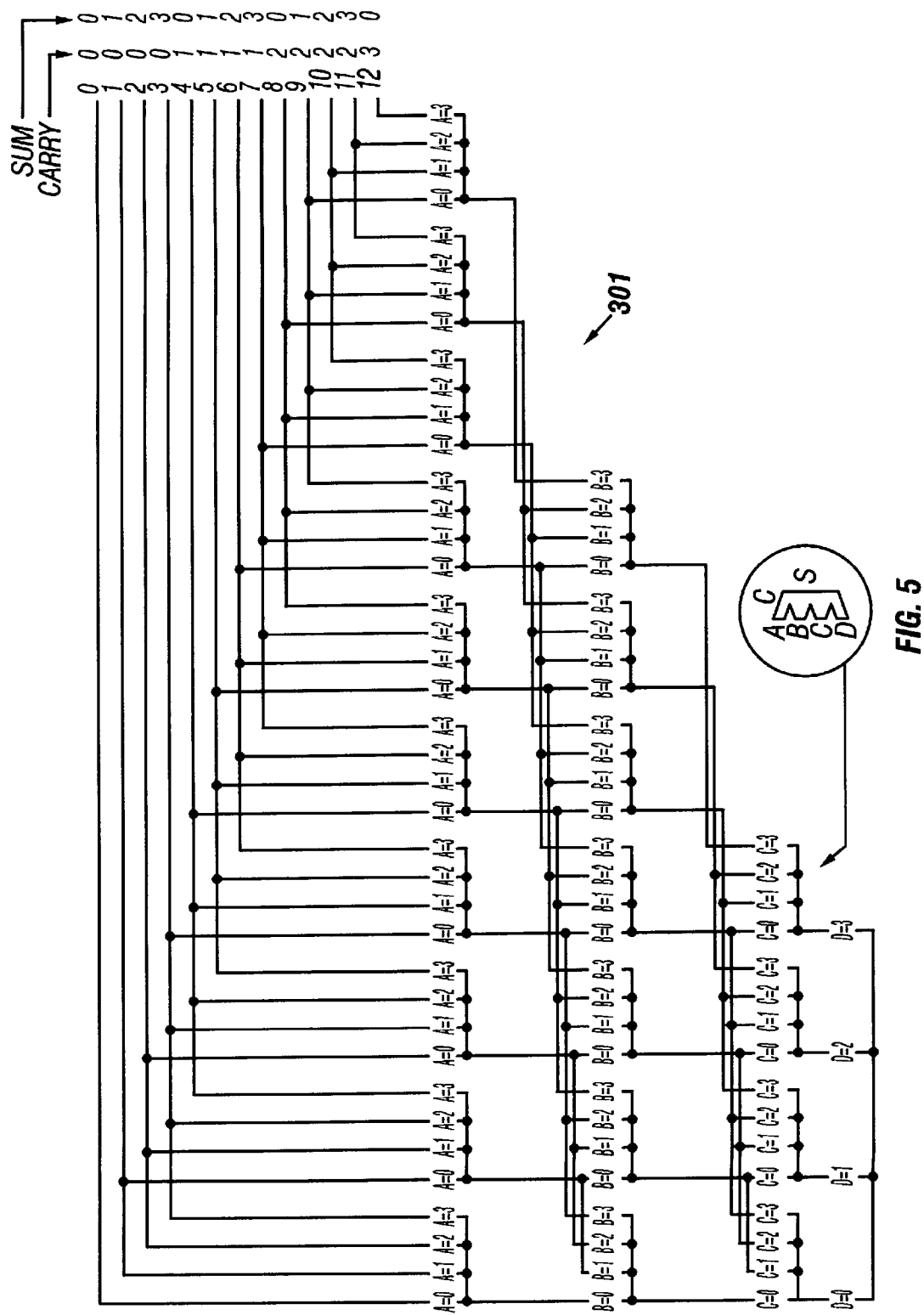
FIG. 5 illustrates one embodiment of a 1-of-4 carry-save adder gate.
Figure 7:
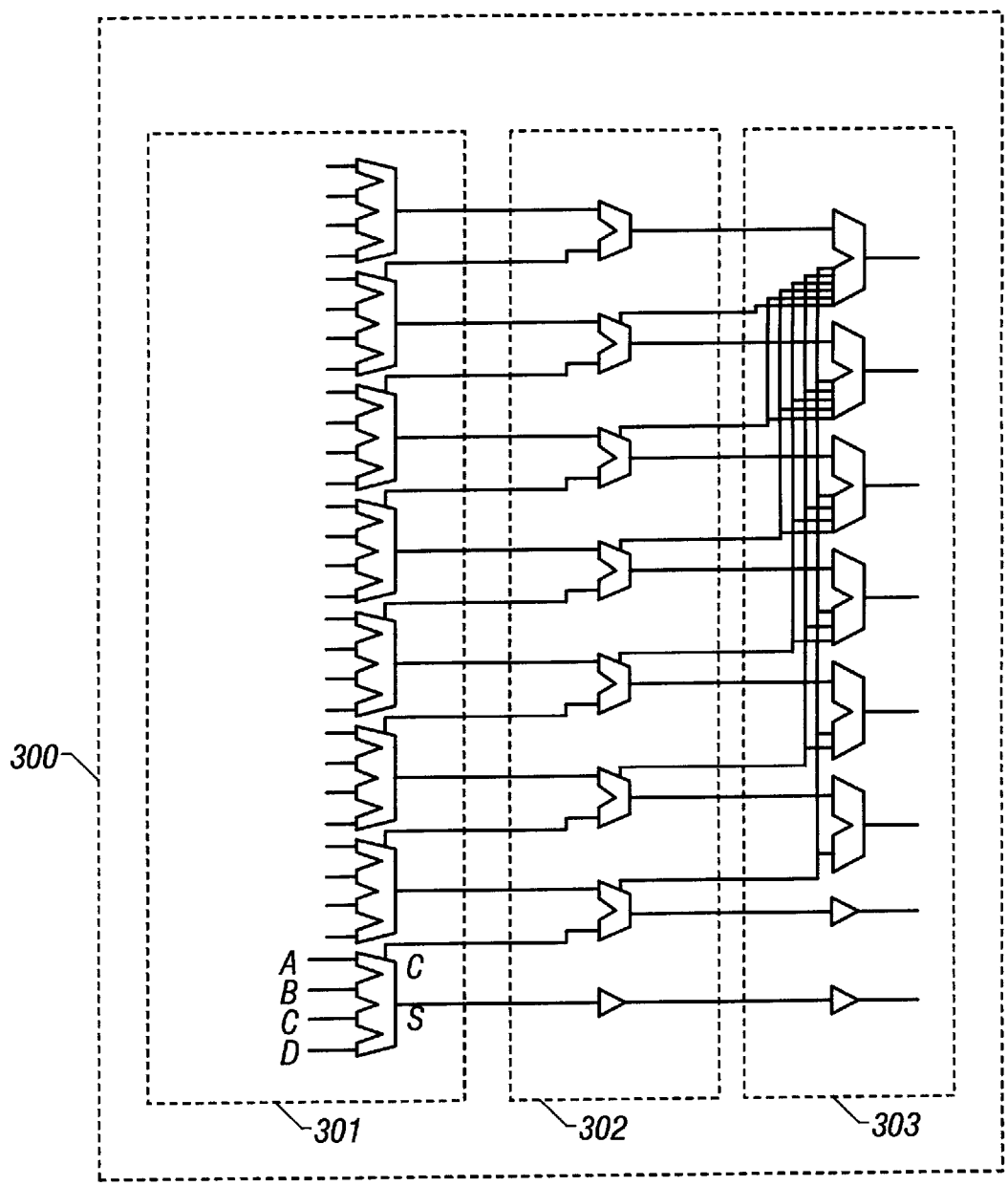
FIG. 7 illustrates one embodiment of a 4-input 3-stage adder for modulo arithmetic.

FIG. 2 illustrates that the present invention utilizes a three-gate delay adder 300 that takes four 16-bit inputs and produces a single 16-bit output FIG. 7 illustrates one embodiment of an adder 300 using N-nary logic. The N-nary logic is described in a patent application, U.S. patent application Ser. No. 09/019355, filed Feb. 5, 1998, now U.S. Pat. No. 6,066,965, and titled "Method and Apparatus for a N-Nary logic Circuit Using 1 of 4 Encoding," which is incorporated herein by reference. FIG. 7 illustrates that the first level of logic in the adder 300 comprises a plurality of 1-of-4 carry-save adder gates 301. FIG. 5 illustrates one embodiment of such a 1-of-4 carry-save adder gate 301.

Using this adder 300, a result 350 can be generated for the "real" portion of the address that is truncated to 16 bits during the first stage 100. This result 350 is selected by a bypass mux 210b at the beginning of the second stage 200. The remaining bypass mux 210a can select the segment_base 70, and the second-stage adder 220 will produce the proper operand address 80. In this manner, 16-bit modulo address generation can be supported quite simply through the use of a redundant 16-bit four-ported adder 300.

I claim:

1. An apparatus that generates an instruction operand address, comprising:
    a first stage circuit that produces a first-stage sum from zero or more component values, said component values further comprise a segment base, a base, a bit offset, an index, a scale, and a displacement;
    said first stage circuit further comprises a pre-add logic circuit, a first-stage-bypass logic circuit coupled to said pre-add logic circuit and to said multi-cycle bypass value datapath, and an index scaler circuit coupled to said pre-add logic circuit and to said multi-cycle bypass value datapath;
    said index scaler circuit further comprises an index scale multiplier coupled to provide its output to said pre-add logic circuit, a scale buffer coupled between said multi-cycle bypass value datapath and said index scale multiplier, wherein said scale buffer is coupled to receive said scale as an input, and an index bypass mux coupled between said multi-cycle bypass value datapath and said index scale multiplier, wherein said index bymass mux is coupled to receive said index as an input:
    a second stage circuit that produces the instruction operand address, said second stage circuit is coupled to said first-stage circuit; and
    one or more multi-cycle bypass value datapaths coupled to said first stage circuit and to said second stage circuit.

2. The apparatus of claim 1 wherein said first-stage-bypass logic circuit further comprises:
    a plurality of first-stage component bypass muxes coupled to said multi-cycle bypass value datapath and to said pre-add logic circuit, wherein one of said first-stage component bypass muxes is coupled to receive said base as an input, and wherein one of said first-stage component bypass mux is coupled to receive said bit offset as an input; and
    a displacement buffer coupled between said multi-cycle bypass value datapath and said pre-add logic circuit, wherein said displacement buffer is coupled to receive said displacement as an input.

3. The apparatus of claim 1 wherein said pre-add logic circuit further comprises:
    a first carry-save adder;
    a second carry-save adder coupled to receive the output of said index scaler circuit as an input and also coupled to receive the output of said first carry-save adder as inputs;
    a third carry-save adder coupled to receive the output of said second carry-save adder as inputs and also coupled to receive said segment base as an input, wherein said third carry-save adder is also coupled to provide its output to said second stage circuit; and
    a four-port, three stage adder coupled to provide its output to said second stage circuit.

4. The apparatus of claim 1 wherein said second stage circuit further comprises:
    a single-cycle bypass value datapath;
    a three-stage 32-bit adder;
    a first second-stage bypass mux coupled to said three-stage 32-bit adder, said first stage circuit, said single-cycle bypass value datapath, said base, and said multi-cycle bypass value datapath; and
    a second second-stage bypass mux coupled to said three-stage 32-bit adder, said first stage circuit, and said multi-cycle bypass value datapath.

5. The apparatus of claim 1 wherein said second stage circuit further comprises:
    a single-cycle bypass value datapath;
    a three-stage 32-bit adder;
    an adjust value datapath;
    a first second-stage bypass mux coupled to said three-stage 32-bit adder, said first stage circuit, said single-cycle bypass value datapath, said base, and said multi-cycle bypass value datapath; and
    a second second-stage bypass mux coupled to said three-stage 32-bit adder, said first stage circuit, said multi-cycle bypass signal datapath, and said adjust value datapath.

6. The apparatus of claim 1 further comprising latches coupled to said first stage circuit and said second stage circuit in order to establish pipelining.

7. The apparatus of claim 1 wherein said first stage circuit comprises:
    a three-stage 32-bit logic path comprising three 32-bit carry-save adders, coupled to provide its output to said second stage circuit; and
    a modulo arithmetic path comprising a 16-bit three-stage adder coupled to receive inputs, and coupled to provide its output to said second stage circuit.

8. A system for generating an instruction operand address, comprising:
    a first stage means for producing a first-stage sum from zero or more component values, said component values further comprise a segment base, a base, a bit offset, an index, a scale, and a displacement;
    said first stage means further comprises a pre-add logic means for adding zero or more of said component values, a first-stage-bypass means for bypassing zero or more of said component values, wherein said first-stage-bypass means is coupled to said pre-add logic means, and an index scaler means for scaling said index, said index scaler means is coupled to said pre-add logic means and to said first-stage-bypass logic means;
    said index scaler means further comprises an index scale multiplier means for multiplying said index by said scale and providing a scaled index to said pre-add logic means, a scale buffer means for receiving and storing said scale. wherein said scale buffer means is coupled between said multi-cycle bypass signal means and said index scale multiplier means, and an index bypass means for bypassing said index, wherein said index bypass means is coupled between said multi-cycle bypass means and said index scale multiplier means;

a second stage means for receiving said first-stage sum and for producing the instruction operand address; and a multi-cycle bypass means for coupling one or more multi-cycle bypass value datapaths to said first stage means and to said second stage means.

9. The system of claim 8 wherein said first-stage-bypass means further comprises:

a first-stage component bypass means for bypassing said bit offset and said base, wherein said first-stage component bypass means is coupled between said multi-cycle bypass means and said pre-add logic means; and a displacement buffer means for receiving and storing said displacement, wherein said displacement buffer means is coupled between said multi-cycle bypass means and said pre-add logic means.

10. The system of claim 8 wherein said pre-add logic means further comprises:

a first adder means for adding three inputs and producing a first redundant sum;

a second adder means for adding three inputs and producing a second redundant sum, wherein said second adder means is coupled to receive the output of said index scaler means as an input and is also coupled to receive said first redundant sum;

a third adder means for adding three inputs and producing a redundant sum, wherein said third adder means is coupled to receive said second redundant sum and is also coupled to receive said segment base, wherein said third adder means is also coupled to provide its output to said second stage means; and a fourth adder means for receiving and adding four or less 16-bit inputs and producing a 16-bit sum to said second stage means.

11. The system of claim 8 wherein said second stage means further comprises:

a first second-stage bypass means for selecting from a first plurality of inputs;

a single-cycle bypass means for delivering at least one bypass value to said first second-stage bypass means;

said first plurality of inputs further comprises said base and the outputs from said single-cycle bypass means, said first stage means, and said multi-cycle bypass means;

a second second-stage bypass means for selecting from a second plurality of inputs, wherein said second plurality of inputs comprises the outputs of said first stage means and said multi-cycle bypass means.

12. The system of claim 8 wherein said second stage means further comprises:

a first second-stage bypass means for selecting from a first plurality of inputs;

a single-cycle bypass means for delivering at least one bypass value to said fist second-stage bypass means;

said first plurality of inputs further comprises said base and the outputs from said single-cycle bypass means, said first stage means, and said multi-cycle bypass means;

an adjust means for providing a constant adjust value for dependent stack address generation;

a second second-stage bypass means for selecting from a second plurality of inputs, wherein said second plurality of inputs comprises the outputs of said first stage means, said multi-cycle bypass means, and said adjust means.

13. The system of claim 8 further comprising a latching means for pipelining said first stage means and said second stage means.

14. The system of claim 8 wherein said first stage means comprises:

a 32-bit arithmetic means for adding zero or more 32-bit said component values and for producing a 32-bit redundant sum to said second stage means; and a 16-bit modulo arithmetic means for adding 16bits of zero, one, two, three, or four of said component values and for producing a 16-bit sum to said second stage means.

15. A method to manufacture an apparatus that generates an instruction operand address, comprising:

providing a first stage circuit that produces a first-stage sum from zero or more component values, said component values further comprise a segment base, a base, a bit offset, an index, a scale, and a displacement;

said step of providing a first stage circuit further comprises providing a pre-add logic circuit, providing a first-stage-bypass logic circuit and coupling said first-stage-bypass logic circuit to said pre-add logic circuit, providing an index scaler circuit, and coupling said index scaler circuit to said pre-add logic circuit and to said first-stage-bypass logic circuit;

said step of providing an index scaler circuit further comprises providing an index scale multiplier, coupling said index scale multiplier to provide its output to said pre-add logic circuit, providing a scale buffer wherein said scale buffer is coupled to receive said scale as an input, coupling said scale buffer between said multi-cycle bypass value datapath and said index scale multiplier, providing an index bypass mux that is coupled to receive said index as an input, and coupling said index bypass mux between said multi-cycle bypass value datapath and said index scale multiplier;

providing a second stage circuit that produces the instruction operand address, said second stage circuit is coupled to said first-stage circuit; and coupling one or more multi-cycle bypass signal datapaths to said first stage circuit and to said second stage circuit.

16. The method of claim 15 wherein said step of providing a first-stage-bypass logic circuit further comprises:

providing a plurality of first-stage component bypass muxes coupled between said multi-cycle bypass signal datapath and said pre-add logic circuit;

coupling a first of said first-stage component bypass muxes to receive said base as an input;

coupling a second of said first-stage component bypass muxes to receive said bit offset as an input;

providing a displacement buffer that is coupled to receive said displacement as an input; and coupling said displacement buffer between said multi-cycle bypass signal datapath and said pre-add logic circuit.

17. The method of claim 15 herein said step of providing a pre-add logic circuit further comprises:

providing a first carry-save adder;

providing a second carry-save adder;

coupling said second carry-save adder to receive the output of said index scaler circuit and the output of said first carry-save adder as inputs;

providing a third carry-save adder;

coupling said third carry-save adder to receive the output of said second carry-save adder and said segment base as inputs;

coupling said third carry-save adder to provide its output to said second stage circuit;

providing a four-port, three stage adder; and coupling said four-port, three-stage adder to provide its output to said second stage circuit.

18. The method of claim 15 wherein said step of providing a second stage circuit further comprises:

providing a single-cycle bypass value datapath;

providing a three-stage 32-bit adder;

providing a first second-stage bypass mux that is coupled to said first stage circuit, said single-cycle bypass value datapath, said base, and said multi-cycle bypass value datapath;

coupling said first second-stage bypass mux to provide its output to said three-stage 32-bit adder;

providing a second second-stage bypass mux that is coupled to said first stage circuit and said multi-cycle bypass value datapath; and coupling said second second-stage bypass mux to provide its output to said three-stage 32-bit adder.

19. The method of claim 15 wherein said step of providing a second stage circuit further comprises:

providing a single-cycle bypass value datapath;

providing a three-stage 32-bit adder;

providing an adjust value datapath;

providing a first second-stage bypass mux;

coupling said first second-stage bypass mux to said three-stage 32-bit adder, said first stage circuit, said single-cycle bypass value datapath, said base, and said multi-cycle bypass value datapath;

providing a second second-stage bypass mux; and coupling said second second-stage bypass mux to said three-stage 32-bit adder, said first stage circuit, said multi-cycle bypass signal datapath, and said adjust value datapath.

20. The method of claim 15 further comprises the step of coupling latches to said first stage circuit and said second stage circuit in order to establish pipelining.

21. The apparatus of claim 15 wherein said step of providing a first stage circuit further comprises:

providing a 32-bit arithmetic path;

coupling said 32-bit arithmetic path to provide its output to said second stage circuit;

providing a 16-bit three-stage adder coupled to receive four inputs; and coupling said 16-bit three stage adder to provide its output to said second stage circuit.

22. A method that generates an instruction operand address, comprising:

generating zero or more multi-cycle bypass values;

generating a first-stage sum from zero or more component values and zero or more said multi-cycle bypass values, said component values further comprise a segment base, a base, a bit offset, an index, a scale, and a displacement;

said step of generating a first-stage sum further comprises generating bypass values for zero or more of said component values, scaling said index to produce a scaled index, adding zero or more of said component values and zero or more of said bypass values and said scaled index to produce said first-stage sum;

said scaling step further comprises providing a bypass value for said index to an index bypass mux, generating an output from said index bypass mux, providing said scale to a scale buffer, passing said scale through said scale buffer, and generating a scaled index by multiplying said scale by the output from said index bypass mux; and performing second-stage processing to generate the instruction operand address from said base, said first-stage sum, and zero or more said multi-cycle bypass values.

23. The method of claim 22 wherein said step of generating a first-stage sum further comprises:

generating bypass values for zero or more of said component values;

scaling said index to produce a scaled index;

adding 16 bits of each of zero or more of said component values and zero or more of said bypass values to generate a 16-bit said first-stage sum.

24. The method of claim 22 wherein said step of generating zero or more multi-cycle bypass values further comprises:

providing a bypass value for said offset to an offset bypass mux;

generating an output from said offset bypass mux;

providing a bypass value for said base to a base bypass mux;

generating an output value from said base bypass mux;

providing said displacement to a displacement buffer; and passing said displacement through said displacement buffer.

25. The method of claim 22 wherein said step of adding further comprises:

adding three 32-bit inputs and producing a first 32-bit redundant sum;

adding said first 32-bit redundant sum and said scaled index to produce a second 32-bit redundant sum;

adding said second 32-bit redundant sum and said segment base to produce a third 32-bit redundant sum;

delivering said third 32-bit redundant sum to said second-stage processing step.

26. The method of claim 22 wherein said step of adding further comprises:

adding four 16-bit inputs to produce a 16-bit sum;

delivering said 16-bit sum to said second-stage processing step.

27. The method of claim 22 wherein said second-stage processing step further comprises:

providing a first plurality of inputs to a first second-stage bypass mux, wherein said first plurality of inputs comprises said base, said first-stage sum and said multi-cycle bypass value;

delivering at least one single-cycle bypass value to said first second-stage bypass mux;

generating an output from said first second-stage bypass mux;

providing a second plurality of inputs to a second second-stage bypass mux, wherein said second plurality of inputs comprises said first-stage sum and said multi-cycle bypass value;

generating an output from said second second-stage bypass mux; and adding said output from said second-stage bypass mux to said output from said first-stage bypass mux.

28. The method of claim 22 wherein said second-stage processing step further comprises:

providing a constant adjust value for dependent stack address generation;

providing a first plurality of inputs to a first second-stage bypass mux, wherein said first plurality of inputs comprises said base, said first-stage sum and said multi-cycle bypass value;

delivering at least one single-cycle bypass value to said first second-stage bypass mux;

generating an output from said first second-stage bypass mux;

providing a second plurality of inputs to a second second-stage bypass mux, wherein said second plurality of inputs comprises said first-stage sum, said multi-cycle bypass value, and said constant adjust value;

generating an output from said second second-stage bypass mux; and adding said output from said second-stage bypass mux to said output from said first-stage bypass mux.

29. The method of claim 22 further comprises pipelining said step of generating a first-stage sums and said second-stage processing step.

30. The method of claim 22 wherein said step of generating a first-stage sum further comprises adding zero or more 32-bit said component values to produce a 32-bit redundant sum.

31. The method of claim 22 wherein said step of generating a first-stage sum further comprises adding 16 bits of zero, one, two, three, or four of said component values to produce a 16-bit sum.

* * * * *